July 22, 1969  F. SÖCHTING  3,456,684
AUTOMATIC VALVE
Filed June 30, 1964

Inventor
Franz Söechting
By Watson, Cole, Grindle & Watson
Attys.

20

United States Patent Office 3,456,684
Patented July 22, 1969

3,456,684
AUTOMATIC VALVE
Franz Söchting, Vienna, Austria, assignor to Enfo Entwicklungs- und Forschungs-Aktiengesellschaft, Vaduz, Liechtenstein
Filed June 30, 1964, Ser. No. 379,179
Claims priority, application Austria, July 4, 1963,
A 5,353/63
Int. Cl. F16k *15/08, 15/12*
U.S. Cl. 137—543.17                4 Claims

ABSTRACT OF THE DISCLOSURE

An automatic valve having a valve seat, a valve guard spaced from the valve seat, a closing element positioned at the valve, and a spring interposed between a supporting surface on the closing element and a supporting surface on the valve guard. In one embodiment of the invention at least one of the supporting surfaces is developed in the shape of a screw line with a changing pitch whereby under a predetermined load that part of the last spring winding resting on the supporting surface is elastically deformed essentially across its entire length and exerts a force on the closing element with the resultant lying at least approximately in the axis of symmetry of the closing element. In another embodiment the last spring winding at one end of the spring is deflected axially outwardly in the shape of a screw line with a changing pitch whereby under a predetermined load the force exerted on the closing element by the spring has a resultant lying at least approximately in the axis of symmetry of the closing element.

---

The invention relates to an automatic valve, particularly for piston-type compressors, comprising a closing member loaded by at least one concentric, for example, cylindrically or conically wound helical spring resting on the closing member with a prestress and serving preferably also for the radial guidance of the closing member during the stroke motion.

The closing member of conventional valves of this type is not lifted simultaneously off the valve seat over its entire circumference during the opening of the valve, the opening motion being one-sided, so that the closing member opens the ports of the valve seat on one side earlier than on the other side with the objectionable result that already when being lifted off the valve seat, the closing member is induced to wobble and consequently, assumes an oblique position during the opening movement, said position being additionally liable to alter during the stroke. These operating conditions cause premature wear of the closing member on the one hand, and the full opening and closing motions of the valves are thereby delayed on the other hand, thereby reducing the flow of the controlled medium. Futhermore, similar valves show a tendency to flutter. The one-sided opening of the closing member is particularly objectionable in valves serving for the limitation of pressure in an enclosed space, such as for example in safety valves incorporated in the crankcase wall of two-stroke internal combustion engines or in large oil tanks, since in these cases positive sealing is required up to a certain, generally comparatively low pressure, whereas when this pressure limit has been exceeded, it is necessary that the valve should open quickly and as completely as possible.

This objectionable operation of the said valves is due to the fact that the closing member is loaded by helical compression springs arranged in coaxial relation to the valve axis. In fact, conventional helical springs, generally coiled from round or rectangular wire, exert a one-sided pressure on their contact surfaces in prestressed condition. This also applies to springs the extremities of which are of conventional design, the last winding of the spring or part of it terminating in a plane whereas the ends of the spring are plane in perpendicular relation to the axis of the spring. Such springs rest on the contact surfaces with their axis in perpendicular relation to said contact surfaces only when in unloaded condition, whereas in their pre-stressed condition they exert an eccentric load. In order to ensure an opening motion of the closing member approximately parallel to the valve seat, plate valves generally comprise individual springs arranged in symmetrical relation to the valve axis on one or a plurality of pitch circles or spring plates having spring tongues bent out of the plane of the plates by means of which the closing member can be concentrically loaded parallel to the valve axis. However, the use of a plurality of individual springs is comparatively costly while the tongues of the spring plates tend to rub on the contact surfaces. Besides, similar spring-loading systems admit of limited strokes only and cannot be simultaneously used for the guidance of the closing member.

It is the object of the invention to improve upon conventional valves comprising helical compression springs arranged in coaxial relation to the valve axis by providing for the deformation of the helical compression spring as present in the closing position of the closing member by adapting the shape of the helical spring and/or by the uneven design of the contact surface at least at one end of the spring in such a way that the forces exerted by the helical spring on the closing member will present a resultant as concentric and paraxial as possible preferably in the closing position of the closing member or at least in the proximity of the closing position. In fact, experience shows that it is comparatively easy to achieve concentric loading of the closing member by means of helical springs at least with a certain amount of prestress and that precisely with automatic valves it is most convenient to load the closing member concentrically in its closing position or at least at a certain point of its stroke, preferably in the vicinity of the closing position. The required shape of the helical spring and/or of the contact surfaces which varies generally with the type of spring used and with the amount of prestress applied, can be determined by calculation and/or experiment. When loaded concentrically in its closing position, the closing member is lifted off the valve seat simultaneously over its entire surface and will consequently, perform at least the initial action of its stroke motion parallel to the valve seat, so that any tendency to wobbling is considerably delayed and reduced and speedy opening of the valve is ensured. Thus the valve according to the invention distinguishes itself by its accurate operation which is a great advantage not only for the frictionless guidance of the closing member by means of the helical spring but also for sliding guidance of the closing member accompanied by a considerable reduction of wear of the guide means.

According to another feature of the invention the shape of the helical spring and/or of the contact surface can be designed in such a way that the forces exerted by the helical spring on the closing member are at least approximately uniformly distributed over the periphery of the closing member preferably in the closing position of the closing member or at least in the vicinity of said closing position. This ensures uniform application of pressure over the circumference of the sealing surface also with due regard to the flexibility of the closing member and will consequently result in a considerable reduction of the bending stresses of the closing member.

Adaptation of the shape of the helical spring to any given requirements can be achieved by various means.

According to the invention, the spring axis of the unloaded helical spring can be curved or angularly-shaped. In a preferred embodiment of the invention the unloaded helical spring is bent outwardly in an axial direction as compared with the contact surface arranged in perpendicular relation to the spring axis at at least one end thereof in the area of the applied winding sections. According to the invention the outwardly bent winding section can at least in the area of its maximum bend be located in a plane inclined in relation to the spring axis. This embodiment of the invention is particularly easy to manufacture. According to a further embodiment of the invention the contact surface can be raised in several places for example by means of a support or washers placed underneath at least at one end of the helical spring. This is a further and comparatively simple means of achieving concentric and uniformly distributed loading of the closing member without it being necessary for the helical spring to be bent upward. However, the desired effect can also be achieved by bending the helical spring upward while at the same time providing contact surfaces of an uneven design.

The scope of the measures to be taken according to the invention for the purpose of achieving concentric loading of the closing member, the required curvature or bend of the spring axis, the necessary bend-up of one or several windings at the ends of the spring as well as the required height and shape of the washer or support, if any, to be provided between the spring and the contact surface, can be calculated for each and every type of valve and for the helical spring used in conjunction therewith. In general, however, this calculation is rather complicated, because usually the spring does not rest on the closing member with a full winding nor over an accurately defiined section of a winding and in most cases also the ends of the spring are ground. It is, therefore, advisible to determine the appropriate spring load in a simple manner by the trial and error method. Once the correct shape of a spring has been determined, the springs of an entire production series can be made according to a pattern. The shape of the springs can be altered as compared with the conventional design within the scope of the invention without any difficulty, because for example, the required bend-up of the last spring windings is merely of the same order as the reduction of the pitch of a spring winding due to the compression of the non-tensioned spring to the amount of prestress required for the closing position.

Further details of the invention will appear from the following description of several embodiments of the invention with reference to the accompanying drawings in which:

FIG. 1 is a longitudinal cross-sectional view of a ring valve;

FIG. 2 a side elevation of the valve spring of the former;

FIG. 3 a schematic view of the development of the valve spring as shown in FIG. 2 in the area of the spring end;

Figure 6:
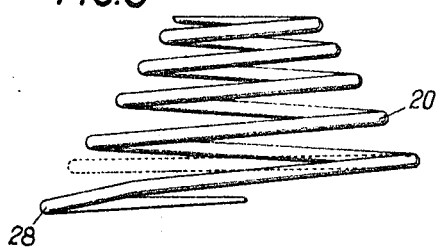

FIG. 6 a side elevation of the valve spring; and

Figure 7:
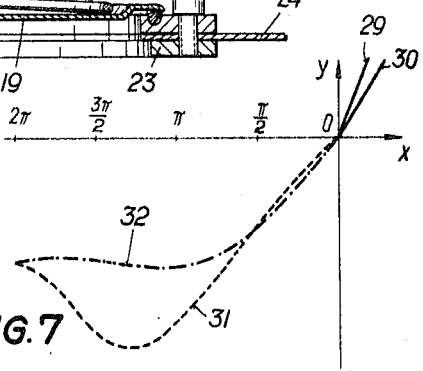

FIG. 7 illustrating the development of the spring end.

Figure 1:
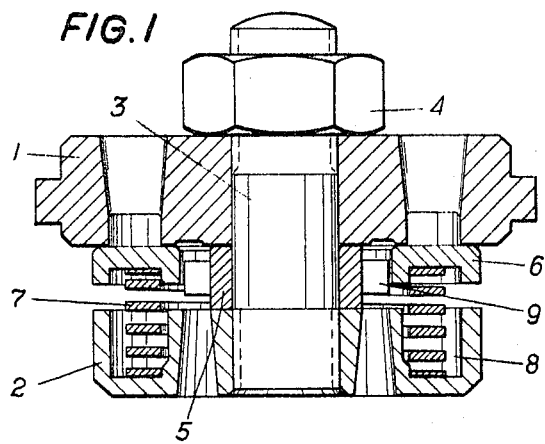

The valve as shown in FIG. 1 comprises a valve seat 1 and a valve guard 2, both elements being interconnected by means of the bolt 3 and nut 4. Between the valve seat 1 and the valve guard 2 a spacer 5 is provided and in the clearance defined by the latter the annular closing member 6 presenting a U-shaped cross-section, is located. The closing member 6 is loaded by means of a concentrically arranged helical compression spring 7 consisting of an edgewise-wound steel strip, protruding into the U-shaped chamber of the closing member 6 and resting upon the valve guard at the bottom of an annular chamber 8 recessed in the latter.

The helical spring 7 is maintained against radial displacement both on the valve guard 2 and on the closing member 6 and serves at the same time for the frictionless guidance of the closing-member 6, so that special provision for such guidance will not be necessary. In order to preclude damage to the valve in the event of breakage of the helical spring 7 and to ensure continued operation, an additional auxiliary guide has been provided for the closing member 6. In the embodiment illustrated this consists of projections 9 arranged gear-ring fashion around the spacer 5, and limiting the travel of the closing member 6 in a radical direction. In this connection, it is important that the external surfaces of the projections 9 serving for the auxiliary guidance of the closing member 6 should be arranged in spaced relation to the closing member 6 so that they will not come into contact with the closing member during the normal concentric operation of the valve, thereby ensuring frictionless working of the latter.

Figure 2:
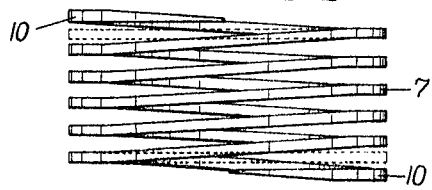

The helical compression spring 7 illustrated in FIG. 2 presents a uniform pitch in its central portion and if it were of the conventional design, both of its extremities would—as indicated by the dotted lines—end in a plane as the pitch decreases in the area of its last windings. Besides, the spring would be ground down in a plane perpendicular to the spring axis. It is true that such a spring, when non-tensioned, presents parallel end planes and in the marginal area at the beginning of the compression also exerts a load on its contact surfaces in a symmetrical relation to the spring axis. Experience has shown, however, that with this design of the spring, the load exerted on the contact surfaces tends to become unsymmetrical as the prestress increases, so that the closing member is pressed against the seat with varying forces around its periphery. This is particularly objectionable in the closing position of the closing member 6 as shown in FIG. 1, since during the opening of the valve, said closing member is lifted off the valve seat 1 one-sidedly and consequently, assumes a tendency to wobble, thereby impairing the working motion of the closing member.

One-sided loading of the closing member 6 can be eliminated by altering the shape of the helical spring 7 as compared with its conventional design. As shown by solid lines in FIG. 2, the end windings of the spring 7 in its unloaded state are bent outwardly in an axial direction in the areas 10, as different from the conventional design presenting a contact surface extending in perpendicular relation to the spring axis. The outwardly bent winding section can be located in a plane inclined in relation to the spring axis at least in the areas 10, for example over an angle in a segment of π/2 each on both sides of the maximum bend-up. Although as a result, the front surfaces of the helical spring 7 in unloaded condition becomes uneven, the extent and location of the bend-ups can be chosen in such a way that the helical spring 7 will be deformed precisely in the closing position of the closing member 6 in such a manner that the forces exerted by it on the closing member present an essentially concentric, and axis-parallel resultant. Thus the closing member 6 will neither be pressed one-sidedly against the valve seat 1 nor will it receive a unilateral momentum producing a tendency to wobble at the beginning of the opening movement.

The required shape of the bend-up at the end of the helical spring 7 can be accurately determined both by calculation and experiment. It depends on the geometrical shape of the helical spring used, and in particular on whether the spring ends are ground down or not and whether the spring rests on the contact surface with a full winding or only with part of the last winding. Another factor to be considered is the distribution of force over the section of the winding resting on the contact surface, which can either be of a uniform nature or limited to a few points only.

Figure 3:
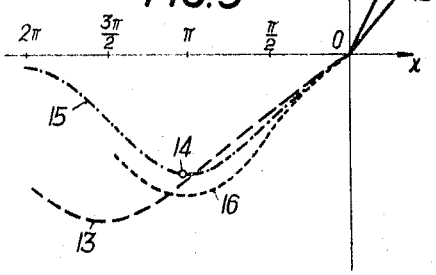

FIG. 3 is a schematic illustration of the calculated pattern of the spring end for several characteristic cases of development. The origin (0) of the coordinate system used is associated with the point of the helical spring 7 where the exposed spring windings end in the closing position of said spring. At the right of the y-axis the pattern of the exposed spring windings is illustrated, curve 11 showing the pattern with the spring unloaded and curve 12 the pattern when loaded for the closing position. On the left side of the y-axis various shapes of the winding sections resting on the closing member 6 and/or at the bottom of the annular chamber 8 in the valve guard 2 are shown.

The end of unloaded helical springs of conventional design comprising end windings ending in a plane is situated on the x-axis. According to the invention, however, the spring is bent up in the area of the applied winding sections. If the closing member 6 is to be concentrically loaded in its closing position with the helical spring 7 resting with a full winding on the contact surfaces and provided the forces acting on the closing member are uniformly distributed over the circumference of the applied winding, the last spring windings at both ends of the helical spring 7 assumes the shape of the dash curve 13. In the other marginal case, however, where half of the force of the spring is transmitted at the point 0 and the other half at the opposite point 14, the pattern of the last spring windings is as illustrated by the dash-and-dot curve 15. An infinity of intermediate solutions are possible within the limits set by these two marginal cases. In case the spring ends should rest on the contact surfaces over an angle of $3\pi/2$ only, while the spring tension is uniformly transmitted by a component acting at the point 0 and over an area symmetrically opposite point 0, the short-dash curve 16 is obtained. As appears from these illustrations, a wide variety of requirements can be met by the appropriate choice of the bend-ups at the spring ends.

Figure 4:
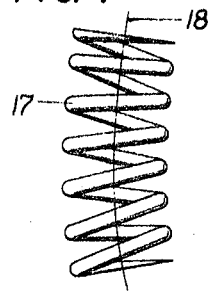
FIG. 4 is a side elevation of a slightly modified type of valve spring.

Another possibility of achieving an axis-parallel, concentric resultant of the forces acting on the closing member by appropriate adaptation of the shape of the helical spring is illustarted in FIG. 4. When unloaded, the helical spring 17 shown therein presents a curved spring axis 18, the opposite end surfaces of the spring 17 being situated in planes which are inclined toward each other. The curvature of the spring axis 18 should be such as to produce in the closing position of the closing member loaded by the spring 17, a deformation of the kind producing a concentric load of the closing member. Instead of being curved, the spring axis 18 can also be of an angle-shaped form. Moreover, the spring axis can also be bent along curves lying in different planes.

Figure 5:
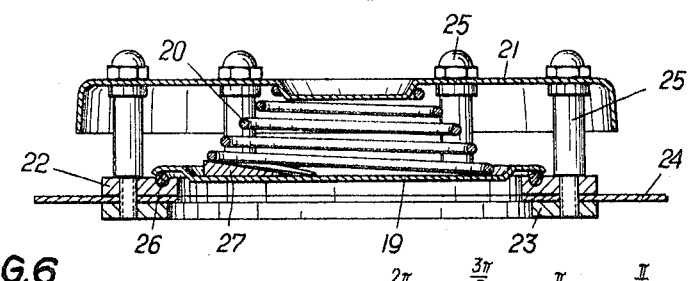
FIG. 5 is a longitudinal cross-sectional view of the valve according to another embodiment of the invention.

The embodiment shown in FIG. 5 refers to a safety valve of the type used in particular for marine engines for the purpose of avoiding damage to the crankcase during explosions in the latter. The closing member 19 consisting of a plate is loaded by means of an approximately conically wound helical compression spring 20 resting with its other end on the cover plate 21 serving as a valve guard. The valve seat ring 22 is attached to the crankcase wall 24 by means of a counter-ring 23. The rings 22, 23 encompass the wall 24 and are secured by means of bolts 25. At the same time, the bolts 25 maintain the cover plate 21 in spaced relation to the valve seat ring 22 and serve also as a radial auxiliary guide for the closing member 19. A gasket 26 made of a soft material inserted in a groove of the valve seat ring 22 serves to improve the sealing of the valve.

On one side of the conical spring 20 a washer or support 27 is inserted between the latter and the closing member 19 for the purpose of obtaining a concentric resultant, practically situated in the valve axis, of the forces exerted by the spring 20 on the closing member 19 in the closing position shown. The required height of the washer 27 can be either calculated or determined by experiment. Moreover, the surface of the washer 27 carrying the conical spring 20 can be adapted to match the desired or required shape of the section of the winding of the spring 20 resting thereon. Instead of the washer 27 the contact surface of the closing member 19 can be made of an appropriately uneven form.

In order to obtain a concentric resultant of the forces acting on the closing member 19, with this embodiment of the invention too, the shape of the conical spring 20, particularly in the area of its last winding resting on the closing member 19, can be adapted to suit any particular requirements instead of the uneven design of the contact surface. As appears from FIG. 6, the conical spring 20, the last winding of which would, according to the conventional design illustrated by the dotted line, end in a plane parallel to the contact surface at the upper end of the spring, is bent outward in the area of its last winding in relation to the contact surfaces extending perpendicular to the spring axis, the last winding in the area 28 presenting the shape illustrated by solid lines. Since the stiffness of the conical spring 20 consisting of a wire of the same gauge throughout, increases substantially in an upward direction in which the diameter of the winding and simultaneously its pitch diminishes, the conditions thus obtained are approximately the same as if the spring were firmly clamped at its upper end. Now if in the closing position of the closing member, the conical spring 20 is deformed in such a manner as to rest with barely one winding on the closing member 19, the required shape and height of the outward bend in the area 28 depends on the displacement, as measured in a peripheral direction, of the lower end of the exposed spring windings in relation to the upper end to be considered clamped.

FIG. 7 is a schematic illustration of the required shape for the last spring winding resting on the closing member 19 for two different examples of development. In this case too, the origin of the coordinate system corresponds to the end of the exposed spring windings and the curves 29 and 30 represented by solid lines on the right side of the y-axis represent the pattern of development of the exposed spring windings above point 0 in an unloaded condition and in the closing position of the closing member 19 respectively. In the event of the two opposite ends of the exposed spring windings being offset in relation to each other in the closing position of the closing member in a peripheral direction by an angle of $\pi/2$, the curve produced by the developed form of the applied last spring winding is shown by the dotted line 31, whereas if the said two ends are offset in relation to each other by an angle of $\pi$, the applied spring winding should be bent upward as shown by the dash-dotted curve 32. The exact pattern of the curves 31 and 32 as well as the shape of the curves resulting from other conditions, can be determined as hereabove explained.

I claim:
1. Automatic valve comprising a valve seat, a valve guard arranged in spaced relation to the seat and having a supporting surface, a closing element cooperating with said seat and having a supporting surface, and a coiled spring between the valve guard and the closing element to press the closing element into its closing position on the valve seat, said spring being arranged coaxially in the valve and rests with its two ends with at least a part of the final winding thereof on the supporting surfaces, the supporting surface on the closing element and the other supporting surface being at a distance from the valve seat whereby in case the spring is unloaded, at least at one end thereof, that part of the last spring winding which rests on the supporting surface whenever the closing element rests on the valve seat in a declined state, has the shape of a screw line with a changing pitch, and the pitch having been selected so that whenever the closing element rests on the valve seat the part of the last winding of the spring resting on the supporting surface will be elastically deformed essentially over its entire length and exerts forces on the closing element whose resultant lies at least approximately in the axis of symmetry of the closing element.

2. Valve according to claim 1 whereby the pitch has been selected so that the forces exerted by the spring on the closing element will be at least approximately evenly divided across the entire periphery of the closing element when the valve is closed.

3. Automatic valve comprising a valve seat, a valve guard arranged in spaced relation to the seat, a closing element cooperating with said valve seat, a coiled spring to press the closing element into its closing position on the valve seat, said spring being arranged coaxially in the valve and resting at both its ends with at least a part of its final winding on supporting surfaces of which one supporting surface is provided on the closing element and the other supporting surface at a distance from the valve seat and in the valve guard, whereby the supporting surface of the spring is developed at least at one end of the spring differently from a plane in the shape of a screw line with a changing pitch and the pitch having been selected so that whenever the closing element rests on the valve seat, that part of the last spring winding resting on the supporting surface is elastically deformed essentially across its entire length and exerts forces on the closing element with the resultant lying at least approximately in the axis of symmetry of the closing element.

4. Automatic valve comprising a valve seat, a closing element cooperating with said valve seat, a coiled spring to press the closing element into its closing position on the valve seat, said spring being arranged coaxially in the valve and rests at two ends on supporting surfaces with at least a part of a final winding, one supporting surface being provided on the closing element and the other supporting surface at the distance from the valve seat, whereby in the case of an unloaded spring, at least one end thereof, the part of the last winding of the spring which rests on the pertinent supporting surface whenever the closing element rests on the valve seat in a declined position, has the shape of a screw line with changing pitch, whereby the supporting surface of the spring at least at one end of the spring has been developed differently from a plane in the form of a screw line with a changing pitch so that if the closing element rests on the valve seat, the part of the last winding of the spring resting on the supporting surface is deformed elastically and essentially across its entire length and exerts forces on the closing element whose resultant lies at least approximately in the axis of symmetry of the closing element.

References Cited

UNITED STATES PATENTS

| 453,347 | 6/1891 | Remington et al. | 137—543.15 X |
| 851,358 | 4/1907 | Kiesselbach | 137—543.15 X |
| 1,677,056 | 7/1928 | Small | 137—543.17 X |
| 2,026,007 | 12/1935 | White | 267—1 X |

FOREIGN PATENTS 205,809  10/1959  Austria.

OTHER REFERENCES

Wahl: Mechanical Springs, 2nd ed., 1963.

WILLIAM F. O'DEA, Primary Examiner

DENNIS H. LAMBERT, Assistant Examiner

U.S. Cl. X.R.

251—337; 267—1